United States Patent [19]

Kusakabe et al.

[11] Patent Number: 5,377,547
[45] Date of Patent: Jan. 3, 1995

[54] PIEZOELECTRIC PRESSURE SENSOR HAVING TUBULAR CHARGE DETECTING UNIT AND METHOD OF ASSEMBLING SAME

[75] Inventors: Hiroki Kusakabe, Osaka; Tohru Okauchi, Katano; Masuo Takigawa, Ikoma, all of Japan

[73] Assignee: Matsushita Electric Industrial Co., Ltd., Osaka, Japan

[21] Appl. No.: 118,678

[22] Filed: Sep. 10, 1993

[30] Foreign Application Priority Data

Sep. 11, 1992 [JP] Japan .................. 4-242917

[51] Int. Cl.6 .................................. C01L 9/08
[52] U.S. Cl. ....................... 73/723; 73/708; 73/745; 29/25.35
[58] Field of Search ............. 73/DIG. 4, 708, 714, 73/745, 754, 723; 29/25.35; 374/143

[56] References Cited

U.S. PATENT DOCUMENTS

| | | |
|---|---|---|
| 3,672,223 | 6/1972 | Spescha . |
| 3,879,174 | 4/1975 | Uhl et al. ................... 29/25.42 |
| 4,530,138 | 7/1985 | Ritter ........................ 29/25.35 |
| 5,138,885 | 8/1992 | Okauchi et al. ................. 73/754 |
| 5,142,914 | 9/1992 | Kusokabe et al. ......... 73/DIG. 4 X |

FOREIGN PATENT DOCUMENTS

| | | |
|---|---|---|
| 0013702 | 8/1980 | European Pat. Off. . |
| 0430445 | 6/1991 | European Pat. Off. . |
| 0447255 | 9/1991 | European Pat. Off. . |
| 1031155 | 6/1953 | France . |
| 392103 | 9/1965 | Switzerland . |

OTHER PUBLICATIONS

Hiroki Kusakabe et al., "A Cylinder Pressure Sensor for Internal Combustion Engine", SAE Technical Paper Series 920701, (1992) pp. 119–124.

*Primary Examiner*—Herbert Goldstein
*Assistant Examiner*—Joseph L. Felber
*Attorney, Agent, or Firm*—Wenderoth, Lind & Ponack

[57] ABSTRACT

A piezoelectric pressure sensor includes a generally elongated sensor housing, a pressure receiving plate disposed at a first end of the sensor housing with a first surface thereof serving as a pressure receiving surface for receiving a pressure applied from outside of the sensor housing, a pressure transmission member accommodated in the sensor housing with a first end thereof held in contact with a second surface of the pressure receiving plate, and a tubular piezoelectric element accommodated in the sensor housing with a first end thereof held in contact with a second end of the pressure transmission member. A pair of electrodes are formed on the external and internal surfaces of the piezoelectric element, respectively. An external charge detection member is held in contact with the external electrode for collecting charge generated by the external electrode and is encircled by a heat-shrinkable tube, while an internal charge detection member is held in contact with the internal electrode for extracting charge therefrom. A fixing screw is threaded into the sensor housing for holding in a prestressed fashion the piezoelectric element and the pressure transmission member against the pressure receiving plate. During assemblage of the pressure sensor, the heat-shrinkable tube undergoes a thermal shrinkage upon application of heat thereto, thereby compressing the external charge detection member radially inwardly against the external electrode.

8 Claims, 5 Drawing Sheets

PIEZOELECTRIC PRESSURE SENSOR HAVING TUBULAR CHARGE DETECTING UNIT AND METHOD OF ASSEMBLING SAME

BACKGROUND OF THE INVENTION

1. Field of the Invention

The present invention relates to a piezoelectric pressure sensor suited for use in detecting the pressure such as, for example, the combustion pressure inside a cylinder of an internal combustion engine.

2. Description of the Prior Art

Piezoelectric pressure sensors are in wide practical use today and make use of the piezoelectric effect wherein charge is produced by the application of a pressure. In recent years, development of a pressure sensor suited for use in detecting the combustion pressure inside a cylinder of an internal combustion engine has been increasingly pursued. Where a piezoelectric element is utilized for measuring the combustion pressure inside the cylinder of which the internal temperature varies considerably, a base line of the sensor output is caused to drift by the pyroelectric effect of the piezoelectric element. Because this pyroelectric effect is produced in a direction along an axis of polarization of the piezoelectric element, it can be canceled by causing the direction of polarization to be perpendicular to the direction in which a pair of electrodes are opposed.

In view of this fact, a tubular piezoelectric element is used which has an axis of polarization in a direction axially thereof and a pair of electrodes formed on external and internal peripheral surfaces thereof, respectively. Japanese Laid-open Patent Publication (unexamined) No. 3-148028 discloses such a piezoelectric pressure sensor, which is particularly shown in FIG. 1.

Figure 1:
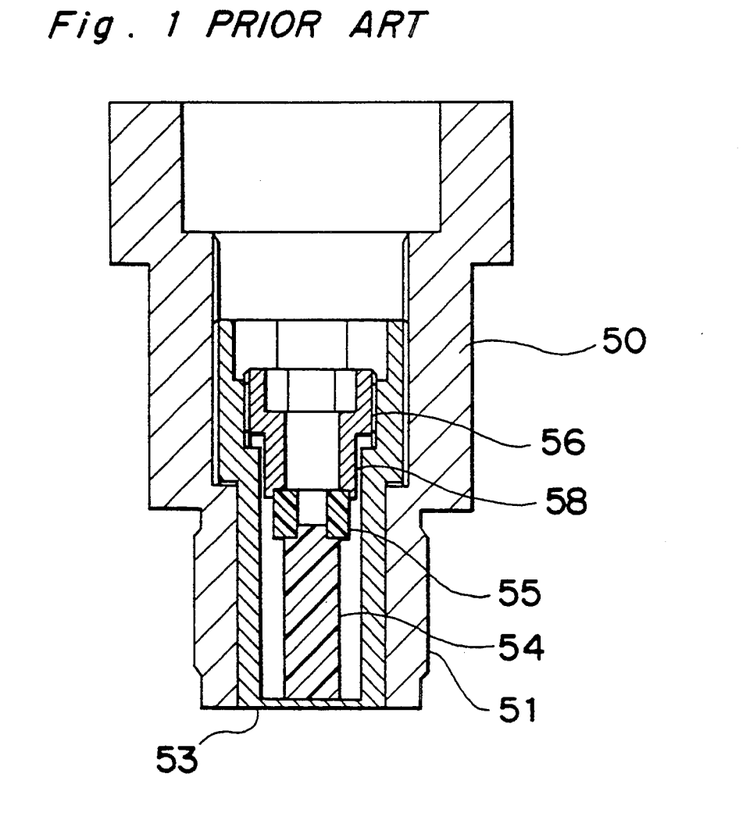
FIG. 1 is a cross-sectional view of a conventional piezoelectric pressure sensor.

The piezoelectric pressure sensor of FIG. 1 has a generally elongated sensor housing 50, a pressure receiving surface 53 disposed at one end thereof, and a mounting screw 51 formed on the external surface thereof. The mounting screw 51 is threaded into, for example, a combustion chamber of an internal combustion engine (not shown) so that the pressure inside the combustion chamber may be appropriately applied to the pressure receiving surface 53. The pressure applied to the pressure receiving surface 53 is then transmitted to a piezoelectric element 55 via a pressure transmission member 54. To this end, the pressure transmission member 54 has one end held in contact with the pressure receiving surface 53 and the other end held in contact with the piezoelectric element 55. The piezoelectric element 55 is pressed against the pressure transmission member 54 by a fixing screw 56 threaded into the sensor housing 50 and is securely held in a prestressed fashion between the pressure transmission member 54 and the fixing screw 56 so that shearing forces may be appropriately applied to the piezoelectric element 55 in proportion to the pressure from the pressure receiving surface 53. The reason for holding the piezoelectric element 55 in the prestressed fashion is to detect not only the positive pressure but also the negative pressure inside the combustion chamber using the piezoelectric element 55. The piezoelectric element 55 has an axis of polarization in a direction axially thereof and also has external and internal electrodes formed on external and internal surfaces thereof, respectively. When the piezoelectric element 55 receives the shearing forces, the charge generated thereby is collected by the external and internal electrodes. The charge collected by the external electrode is extracted by an external charge detection member 58 integrally formed with the fixing screw 56, whereas the charge collected by the internal electrode is extracted by an internal charge detection member (not shown) inserted into and held in the sensor housing 50.

In the pressure sensor of the above-described construction, extraction of the charge from the external electrode of the piezoelectric element 55 is conducted through a metallic contact.

Figure 3:
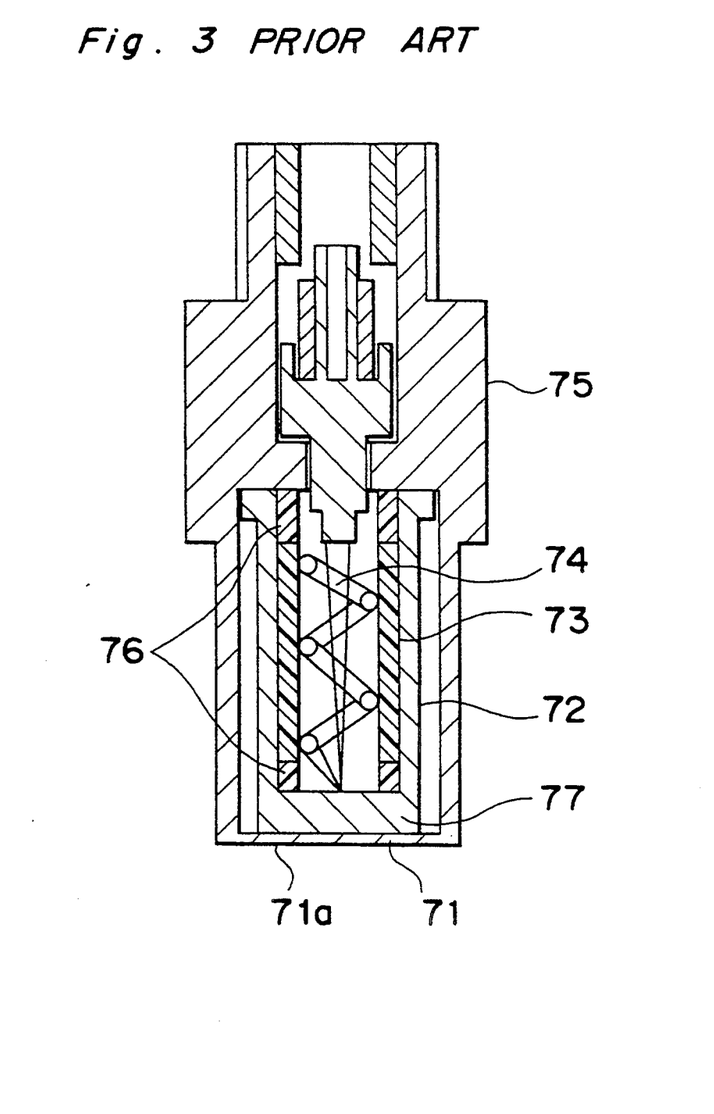
FIG. 3 is a cross-sectional view of another conventional piezoelectric pressure sensor.

Furthermore, a pressure sensor employing a tubular diaphragm suited for use in detecting, for example, the combustion pressure inside the cylinder of the internal combustion engine has been developed. FIG. 3 depicts a conventional piezoelectric pressure sensor employing such a tubular diaphragm, which sensor is generally used in the internal combustion engine.

The piezoelectric pressure sensor of FIG. 3 comprises a generally elongated sensor housing 75, a piezoelectric element 73 made of crystal and accommodated in the sensor housing 75, upper and lower thermal expansion compensating members 76 between which the piezoelectric element 73 is sandwiched, a pressure transmission base 77 held in contact with the lower thermal expansion compensating member 76, and a pressure receiving portion 71 having a lower surface serving as a pressure receiving surface 71a and an upper surface held in contact with the pressure transmission base 77. The piezoelectric element 73 has external and internal electrodes formed on external and internal surfaces thereof, respectively. The external and internal electrodes are held in contact with a tubular diaphragm 72 and a charge detection member 74, respectively.

The piezoelectric pressure sensor of the above-described construction operates as follows.

The pressure applied to the pressure receiving surface 71a from outside of the sensor housing 75 is transmitted as a compression force to the piezoelectric element 73 via the lower thermal expansion compensating member 76. Because the piezoelectric element 73 has been subjected to a polarization treatment in a direction axially thereof, charge is generated on the electrodes in proportion to the magnitude of the compression force by the so-called longitudinal effect mode (d31) of a piezoelectric phenomenon. The charge generated on the external electrode is led to the sensor housing 75 via the diaphragm 72, whereas that generated on the internal electrode is collected by the charge detection member 74.

The above-described construction is, however, at a disadvantage in that a reliable contact between the diaphragm 72 and the piezoelectric element 73 cannot be obtained at high temperatures due to a difference between the thermal coefficient of expansion of the metallic material and that of the ceramic material. In order to use this pressure sensor in detecting the internal pressure of the combustion chamber of the internal combustion engine, the pressure sensor is required to have temperature characteristics guaranteed in the range of from −40° C. to 250° C. at the location of the piezoelectric element 73 and frequency characteristics guaranteed in the range of from 0.5 kHz to 20 kHz. Under such conditions, problems of contact become large, and in an internal combustion engine attended with severe vibrations, unstable contact causes variations in sensor output.

Figure 2:
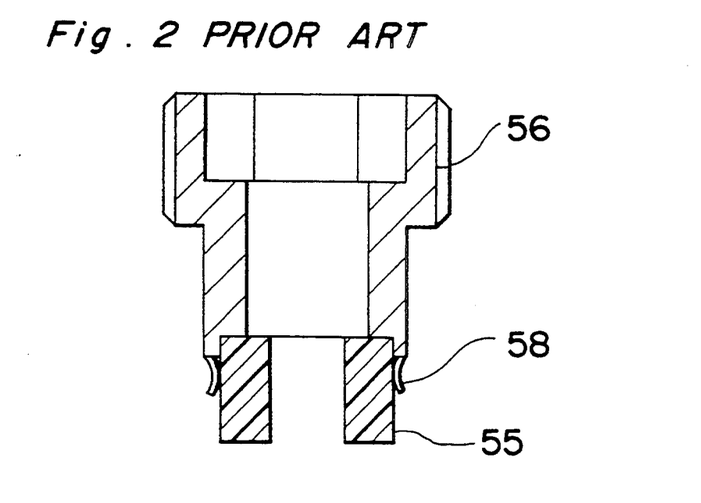
FIG. 2 is a cross-sectional view of a main portion of the piezoelectric pressure sensor of FIG. 1.

A method of detecting charge by holding the external electrode with the use of an elastic material is also proposed. FIG. 2 depicts a conventional charge detecting unit employing such a method.

The charge detecting unit of FIG. 2 includes a piezoelectric element 55 and an external charge detection member 58 made of elastic material for radially inwardly biasing the external electrode against the piezoelectric element 55. The external charge detection member 58 detects charge generated at the time a stress is applied to the piezoelectric element 55.

The charge detecting unit of FIG. 2 is, however, at a disadvantage in that the external charge detection member 58 and the external electrode are in point or line contact with each other, thereby enlarging the contact resistance. Furthermore, the elasticity of the external charge detection member 58 deteriorate with age, thus causing an unstable contact.

In addition, when the elastic material is employed, the thickness thereof should be greater than about 1 mm sufficient strength and durability. For this reason, it is practically impossible to make pressure sensors having an outer diameter less than 10 mm.

In general, piezoelectric pressure sensors are intended to detect, for example, the internal pressure of a combustion chamber of an internal combustion engine. When a piezoelectric pressure sensor is mounted on the combustion chamber, a chamber wall of the combustion chamber is required to have an opening defined therein for receiving the pressure sensor. However, because the strength of the engine and combustion gas streams inside the engine are affected by the opening, the outer diameter of the pressure sensor should be made as small as possible.

There is also another problem that the distribution of the pressure applied to the piezoelectric element varies according to assemblage errors and changes the mode ratio of the piezoelectric phenomenon, thereby causing relatively large variations in sensor sensitivity and in temperature-dependent characteristics.

In the construction shown in FIG. 3, when rapid temperature changes have occurred on the pressure receiving surface 71a, for example, in suction strokes or combustion and expansion strokes of the engine, expansion and contraction of the sensor housing 75 caused by heat generated in the proximity of the pressure receiving surface 71a tends to bring about strains in the output waveform. Furthermore, because heat entering the inside of the sensor housing 75 through the pressure receiving surface 71a is directly transmitted to the piezoelectric element 73, the piezoelectric element 73 is subjected to high temperatures and is, hence, deteriorated, resulting in considerable variations in sensor sensitivity. To overcome these problems, a water jacket is generally disposed around the conventional sensor to cool it.

Independently of the expansion and contraction caused by the heat generated in the proximity of the pressure receiving surface 71a, a temperature increase of the sensor housing 75 results in a reduction of the insulating resistance of a signal transmission system and occasionally causes an output drift, or temperature changes of the piezoelectric element change the piezoelectric constant, thereby causing variations in sensor sensitivity. Water-cooling is also required to reduce such influences.

SUMMARY OF THE INVENTION

The present invention has been developed to overcome the above-described disadvantages.

It is accordingly an object of the present invention to provide an improved highly reliable piezoelectric pressure sensor having a reduced outer diameter wherein a piezoelectric element and an external electrode are positively in pressure contact with each other.

Another object of the present invention is to provide a piezoelectric pressure sensor of the above-described type having minimized variations in both sensitivity and temperature-dependent characteristics.

In accomplishing the above and other objects, a piezoelectric pressure sensor according to the present invention comprises a generally elongated sensor housing, a pressure receiving plate disposed at a first end of the sensor housing with a first surface of the pressure receiving plate serving as a pressure receiving surface for receiving a pressure applied from outside of the sensor housing, a pressure transmission member accommodated in the sensor housing with a first end thereof held in contact with a second surface of the pressure receiving plate, and a tubular piezoelectric element accommodated in the sensor housing with a first end thereof held in contact with a second end of the pressure transmission member. A pair of electrodes are formed on external and internal surfaces of the piezoelectric element, respectively. An external charge detection member is held in contact with the external electrode for collecting charge generated by the piezoelectric element, and is encircled by a heat-shrinkable tube. The piezoelectric element and the pressure transmission member are held in a prestressed fashion against the pressure receiving plate by a fixing screw threaded into the sensor housing. An internal charge detection member is held in contact with the internal electrode for extracting charge therefrom.

During assemblage of the pressure sensor of the above-described construction, the heat-shrinkable tube undergoes a thermal shrinkage upon application of heat thereto, thereby compressing the external charge detection member radially inwardly against the external electrode.

Preferably, the external charge detection member has a projection to which a lead wire is connected.

The external charge detection member may be so designed as to have a tubular contact portion and a flange extending radially inwardly from the contact portion. In this case, the contact portion of the external charge detection member is held in contact with the external electrode for collecting charge generated by the external electrode, and an insulating ring is disposed between a second end of the piezoelectric element and the flange of the external charge detection member. By so doing, the flange of the external charge detection member is pressed down by the fixing screw, and the charge collected by the contact portion of the external charge detection member is detected via the flange.

Advantageously, a metallic piece is interposed between the pressure receiving plate and the pressure transmission member to enlarge the thermal capacity of the pressure receiving surface. The pressure transmission member held in contact with the metallic piece is made of, for example, ceramic.

Preferably, the pressure sensor includes a temperature-sensitive resistor element accommodated in the sensor housing for detecting a temperature increase inside the sensor housing and a connector having a ceramic base and a plurality of terminals carried by the ceramic base, two of which terminals are connected to the temperature-sensitive resistor element. The connector is disposed at the second end of the sensor housing to hermetically seal a recess defined in the sensor housing. The charge generated in the piezoelectric element is extracted to the outside of the sensor housing via the connector.

Advantageously, the contact portion of the external charge detection member partially takes the form of a comb having a plurality of regularly spaced teeth. Alternatively, the entire contact portion may take the form of a comb extending downwardly from the external edge of the flange.

In another aspect of the present invention, a method of assembling a charge detecting unit comprises the steps of:

(a) preparing a positioning tool having a support base and a rod portion extending therefrom in a direction generally perpendicular thereto;

(b) axially aligning the charge detection member, the insulating ring, and the piezoelectric element along the rod portion of the positioning tool; and (c) heating the charge detection member, the insulating ring, and the piezoelectric element together with the positioning tool to cause shrinkage of the heat-shrinkable tube, thereby compressing the contact portion of the charge detection member radially inwardly against the external electrode.

Advantageously, prior to the step (c), a compression load is applied to the charge detection member, the insulating ring, and the piezoelectric element in a direction axially of the positioning tool.

According to the present invention, the external charge detection member is firmly held in contact with the external electrode, and extraction of charges is conducted from the external and internal surfaces and not from the upper and lower surfaces of the piezoelectric element.

The provision of the projection on the external charge detection member can enhance the reliability in electrical connection between the external charge detection member and the outside of the sensor housing, thus contributing to an accurate and highly reliable charge detection.

Furthermore, the comb-like configuration of the contact portion of the external charge detection member reduces strains which are generated when the heat-shrinkable tube shrinks, thereby facilitating a highly reliable charge detection.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 4:
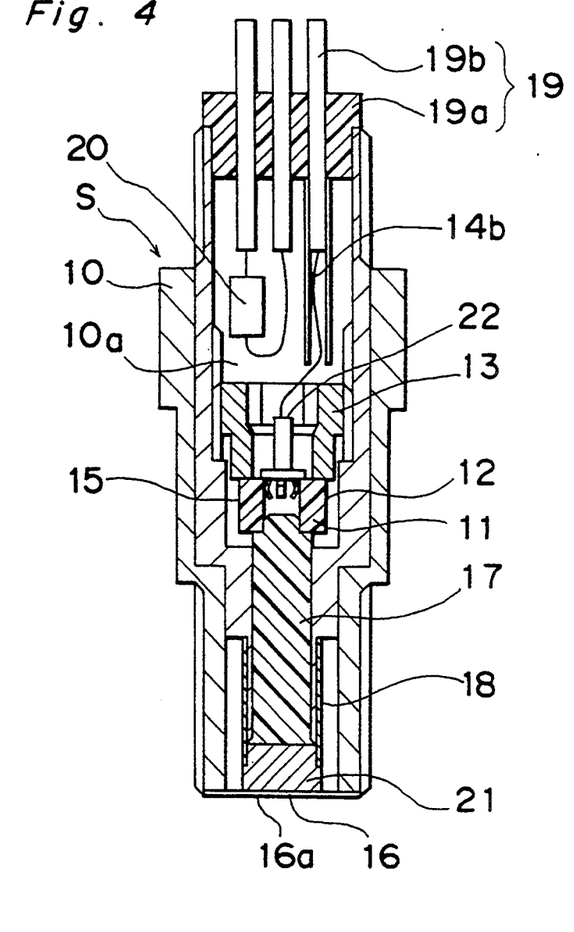
FIG. 4 is a cross-sectional view of a piezoelectric pressure sensor according to the present invention.

Referring now to the drawings, there is shown in FIG. 4 a piezoelectric pressure sensor S embodying the present invention. In applications where this pressure sensor S is used to detect the internal pressure of a combustion chamber of an internal combustion engine, the pressure sensor S is securely mounted on a chamber wall of the combustion chamber. The pressure sensor S comprises a generally elongated sensor housing 10 having a recess 10a defined therein and a piezoelectric element 11 accommodated in the recess 10a. The piezoelectric element 11 consists essentially of, for example, lead titanate oxide and includes Mn, La or the like added thereto. The piezoelectric element 11 is polarized in a direction axially thereof and has a pair of electrodes 11a and 11b (See FIG. 5) formed on external and internal peripheral surfaces thereof, respectively.

Figure 5:
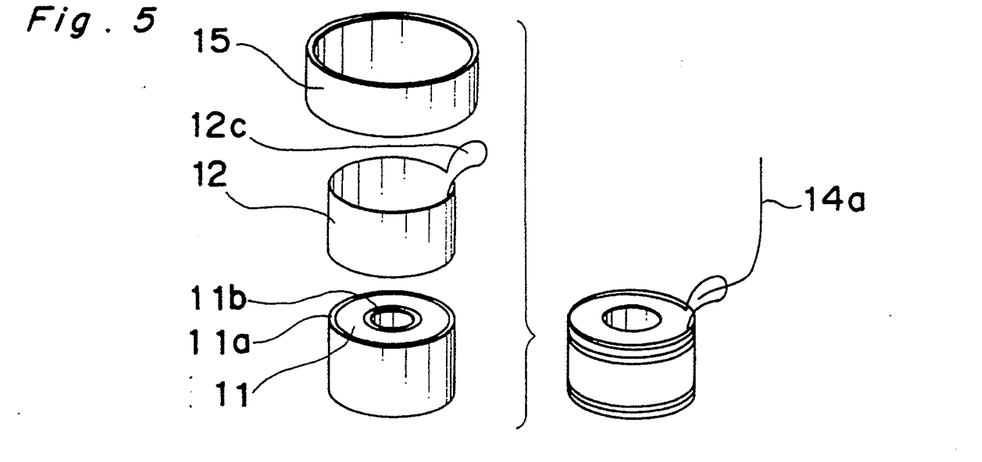
FIG. 5 is an exploded perspective view of a charge detecting unit of the piezoelectric pressure sensor of FIG. 4.

FIG. 5 depicts a charge detecting unit comprised of the piezoelectric element 11 and some other elements disposed in the proximity thereof. The piezoelectric element 11 is encircled by an external charge detection member 12, and the external surface of the former is in contact with the internal surface of the latter. The external charge detection member 12 is made of a conductive foil such as, for example, a copper foil. The external charge detection member 12 has a projection or tab 12c for connection thereof with a lead wire 14a, through which charge is detected. The external charge detection member 12 is encircled by a heat-shrinkable tube 15. After these elements have been assembled together, the application of heat to the heat-shrinkable tube 15 causes shrinkage of the heat-shrinkable tube 15 to a size adapted to fit over the external charge detection member 12, thereby compressing the latter radially inwardly against the external electrode 11a of the piezoelectric element 11 so that the external charge detection member 12 may be firmly held on the external electrode 11a. This structure reduces the contact resistance between the external electrode 11a and the external charge detection member 12 and enables accurate and highly reliable charge detection. Fluorinated ethylene/propylene or ethylene/tetrafluoroethylene is preferably used as the material of the heat-shrinkable tube 15.

Referring again to FIG. 4, the pressure sensor S further comprises a pressure receiving plate 16 having an external surface 16a which serves as a pressure receiving surface for receiving a pressure from the combustion chamber. The pressure receiving plate 16 is integrally formed with the sensor housing 10 or otherwise rigidly secured thereto by welding or the like. The internal surface of the pressure receiving plate 16 is held in contact with a lower surface of a metallic piece 21. The metallic piece 21 is held, at an upper surface thereof, in contact with a lower end of a generally elongated pressure transmission member 17, an upper end of which is held in contact with a lower portion of the piezoelectric element 11 so that the pressure transmission member 17 can transmit the pressure applied to the pressure receiving surface 16a to the piezoelectric element 11. The pressure transmission member 17 is made of, for example, ceramic. That portion of the pressure transmission member 17 which is held in contact with the piezoelectric element 11 is machined generally at right angles, as best shown in FIG. 4, so that shearing forces may be applied thereto. The piezoelectric element 11 and the pressure transmission member 17 are appropriately pre-pressed against the metallic piece 21 by threading a fixing screw 13 deep into the recess 10a of the sensor housing 10. A lower portion of the pressure transmission member 17 is encircled by and spaced away from a tubular diaphragm 18. The diaphragm 18 is made thin as compared with other constituent elements so as to readily expand and contract when the pressure applied to the pressure receiving surface 16a is transmitted to the piezoelectric element 11. The pressure sensor S is designed such that the transmission of the pressure to the piezoelectric element 11 is achieved by the pressure transmission member 17 with the diaphragm 18 expanded or contracted.

An internal charge detection member 22 is securely mounted on an upper portion of the piezoelectric element 11 and is connected to the internal electrode 11b to extract charge therefrom. The internal charge detection member 22 is also connected to a lead wire 14b.

On an upper end of the sensor housing 10 is disposed a connector 19 having a ceramic base 19a securely mounted thereon to hermetically seal the recess 10a of the sensor housing 10. The connector 19 also has a plurality of, for example three, metallic terminals 19b carried by the ceramic base 19a and extending generally in the axial direction of the sensor housing 10. One of the metallic terminals 19b is connected to the lead wire 14b, whereas the other two metallic terminals 19b are connected to a temperature-sensitive resistor element 20 for rectifying the sensitivity of the piezoelectric element 11 which is apt to change according to temperature changes of the sensor housing 10.

The pressure sensor S of the above-described construction operates as follows.

A pressure change in the combustion chamber is initially sensed by the pressure receiving surface 16a and is subsequently transmitted to the pre-pressed piezoelectric element 11 via the metallic piece 21 and the pressure transmission member 17. At this time, the piezoelectric element 11 generates charges corresponding to the transmitted pressure on the external and internal electrodes 11a and 11b thereof. These charges are respectively detected by the external charge detection member 12 and the internal charge detection member 22. The charge detected by the external charge detection member 12 is grounded via the sensor housing 10, whereas the charge detected by the internal charge detection member 22 is converted into an electric signal, which is in turn transmitted to the outside of the sensor housing 10 via the connector 19.

The transmitted signal is led to an operational amplifier (not shown) for amplification thereof, and the amplified signal is converted into a pressure value by a signal processor (not shown). The pressure value is then transmitted to, for example, an engine controller.

As described hereinabove, according to the present invention, because the external charge detection member 12 is pressed against the external electrode 11a of the piezoelectric element 11 by the heat-shrunk tube 15, the external electrode 11a and the external charge detection member 12 are reliably held in contact with each other, thereby minimizing variations of the detected charge and, hence, enhancing the accuracy of the detected pressure.

Figure 6:
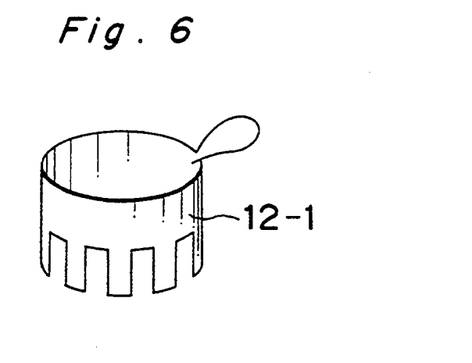
FIG. 6 is a perspective view of an external charge detection member of the charge detecting unit.

It is to be noted that in the above-described embodiment, although the external charge detection member 12 has a tubular body, it may have a comb-ended tubular body having a plurality of regularly spaced teeth, as shown by 12-1 in FIG. 6, to thereby partially reduce strains which are generated when the heat-shrinkable tube 15 shrinks.

It is also to be noted that the connector 19 may have four metallic terminals instead of three. In this case, the external charge detection member 12, which is grounded via the sensor housing in the above-described embodiment, is electrically connected to one of the four metallic terminals and is led to the outside of the sensor housing.

Figure 7:
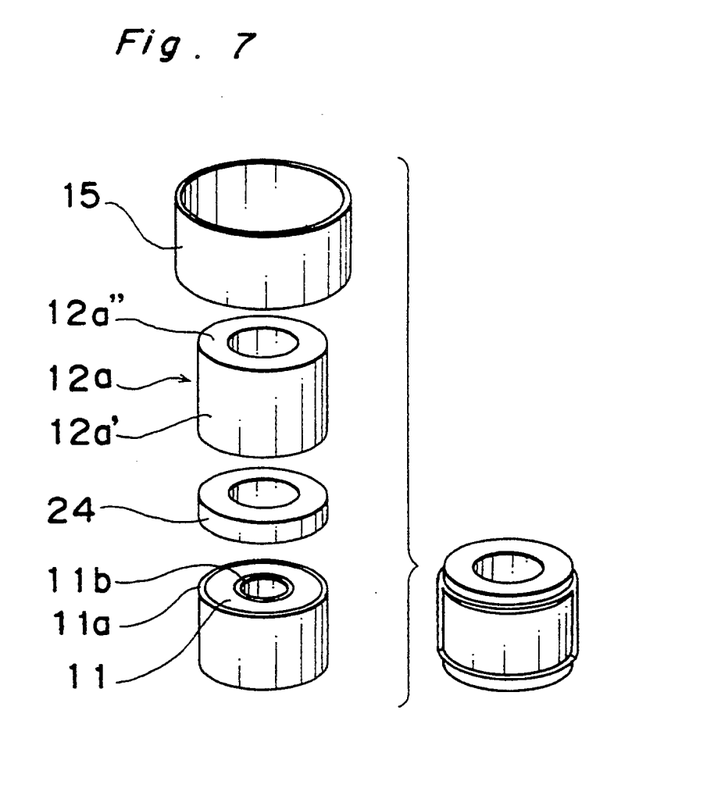
FIG. 7 is a view similar to FIG. 5, but indicating a modification thereof.

FIG. 7 depicts a modification of the charge detecting unit.

As shown in FIG. 7, an insulating ring 24 is disposed on a piezoelectric element 11 having external and internal electrodes 11a and 11b formed on external and internal surfaces thereof, respectively. The piezoelectric element 11 along with the insulating ring 24 are covered with an external charge detection member 12a which has a tubular contact portion 12a' and a flange 12a'' extending radially inwardly from an upper edge of the contact portion 12a'. The insulating ring 24 insulates the upper surface of the piezoelectric element 11 from the flange 12a'' of the external charge detection member 12a. Ceramic such as, for example, alumina having high-temperature insulating properties is preferably used as the material of the insulating ring 24. The contact portion 12a' of the external charge detection member 12a is encircled by a heat-shrinkable tube 15.

Upon application of heat to the heat-shrinkable tube 15, the heat-shrinkable tube 15 undergoes a thermal shrinkage to a size adapted to fit over the external charge detection member 12a, thereby compressing it radially inwardly against the external electrode 11a of the piezoelectric element 11. As a result, the internal surface of the contact portion 12a' of the external charge detection member 12a is reliably held in contact with the external electrode 11a. The provision of the insulating ring 24 enhances the reliability in insulating between the piezoelectric element 11 and the flange 12a'' of the external charge detection member 12a.

According to this modification, an accurate and highly reliable charge detection is possible by pressing the flange 12a'' in the axial direction of the sensor housing 10 with the use of the fixing screw 13 shown in FIG. 4.

Figure 8:
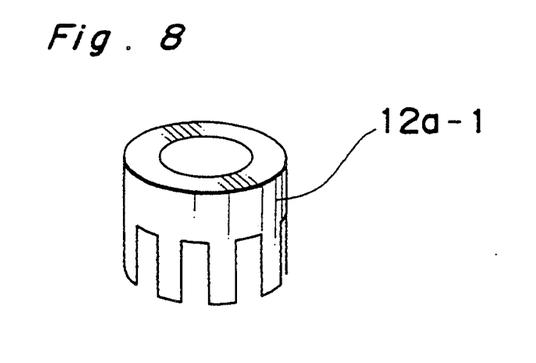
FIG. 8 is a view similar to FIG. 6, but indicating a modification thereof.

As is the case with the external charge detection member 12-1 shown in FIG. 6, the external charge detection member may be so configured that a lower portion of the tubular contact portion takes the form of a comb as shown by 12a-1 in FIG. 8.

Figure 9:
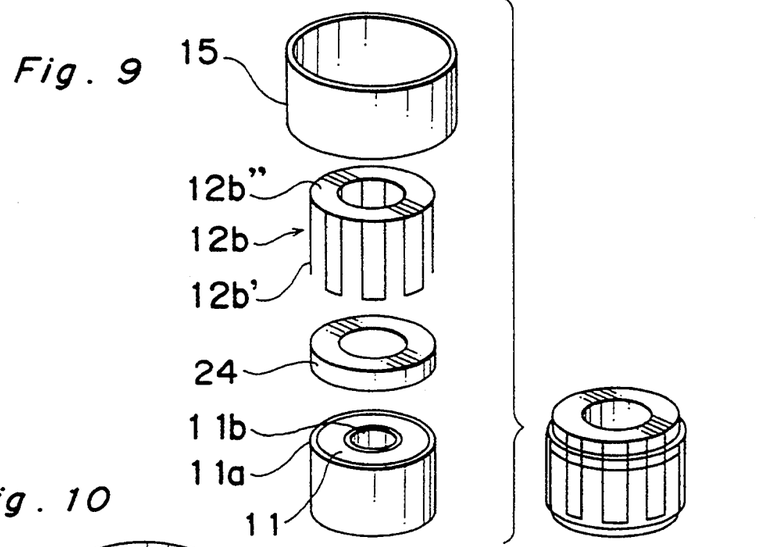
FIG. 9 is a view similar to FIG. 5, but indicating another modification thereof.

FIG. 9 depicts another modification of the charge detecting unit.

An external charge detection member 12b of FIG. 9 is in the form of a comb having a plurality of regularly spaced teeth 12b' extending downwardly from the external edge of a flange 12b''.

This external charge detection member 12b has the advantage of minimizing strains which are generated when the heat-shrinkable tube 15 shrinks, thus contributing to highly reliable charge detection.

Figure 10:
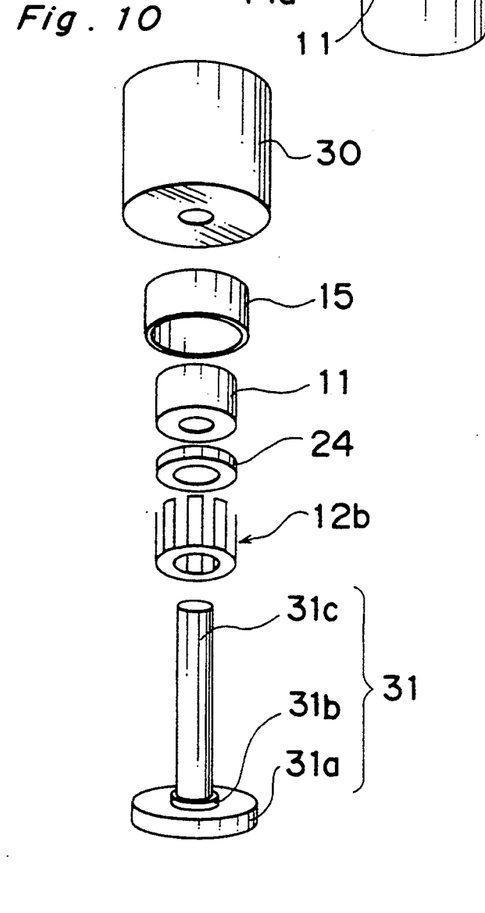
FIG. 10 is an exploded perspective view of the charge detecting portion of FIG. 9 during assembly.
Figure 11:
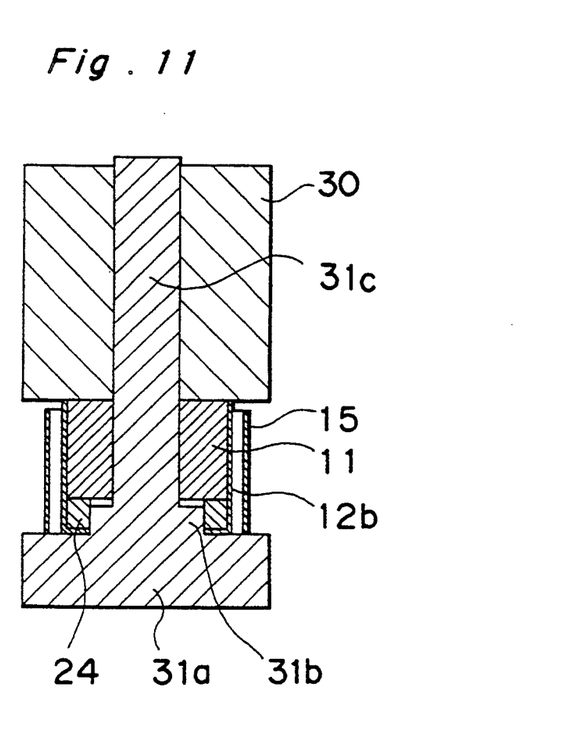
FIG. 11 is a cross-sectional view of the charge detecting unit of FIG. 9 after assembly.

It is preferred that the elements shown in FIG. 9 are assembled by the use of a positioning tool or jig 31 as shown in FIGS. 10 and 11.

The positioning jig 31 is of one-piece construction and has a generally round support base 31a, a shoulder portion 31b formed on the support base 31a, and a rod portion 31c extending upwardly from the shoulder portion 31b. The support base 31a, the shoulder portion 31b, and the rod portion 31c are coaxially aligned with one another.

The positioning jig 31 is designed such that the outer diameter of the rod portion 31c is slightly less than the inner diameter of the piezoelectric element 11, and the outer diameter of the shoulder portion 31b is slightly less than the inner diameter of the insulating ring 24 and that of the flange 12b" of the external charge detection member 12b. Accordingly, when the flange 12b" of the external charge detection member 12b, the insulating ring 24, and the piezoelectric element 11 are placed on the support base 31a one upon another in this order from below, the external charge detection member 12b and the insulating ring 24 are appropriately positioned by the shoulder portion 31b, while the piezoelectric element 11 is appropriately positioned by the rod portion 31c. The use of the positioning jig 31 facilitates the axial alignment of the external charge detection member 12b, the insulating ring 24, and the piezoelectric element 11.

After the positioning of these three elements 12b, 24, and 11, the heat-shrinkable tube 15 is placed so as to encircle the external charge detection member 12b. Thereafter, a weight 30 is placed on the piezoelectric element 11 to apply a compression load to the piezoelectric element 11, the insulating ring 24, and the flange 12b" of the external charge detection member 12b, as shown in FIG. 11. These elements appropriately positioned by the positioning jig 31 are then heated so that the heat-shrinkable tube 15 may undergo a thermal shrinkage to a size adapted to fit over the contact portions 12b' of the external charge detection member 12b.

More specifically, when the charge detecting unit is incorporated into the sensor housing, a compression force is applied thereto in the axial direction thereof. Because the compression force is transmitted to the piezoelectric element 11 via the insulating ring 24, variations in the position of these elements cause variations in stress distribution in the piezoelectric element 11, and hence, cause variations in sensor output. Furthermore, variations in the position of the external charge detection member 12b occasionally result in contact failure between it and the external electrode 11a, thereby considerably reducing the reliability of the pressure sensor.

To overcome such problems, the use of the positioning jig 31 is preferred whereby, during positioning, the flange 12b" of the external charge detection member 12b and the insulating ring 24 are guided along the shoulder portion 31b, whereas the piezoelectric element 11 is guided along the rod portion 31c so that the external charge detection member 12b, the insulating ring 24, and the piezoelectric element 11 may be coaxially aligned with one another. Accordingly, when the compression force is applied to the charge detecting unit, the stress distribution in the piezoelectric element 11 is caused to be substantially uniform, thereby reducing variations in sensor sensitivity.

Furthermore, because the heat-shrinkable tube 15 is generally heated in a heating furnace, air streams within the furnace or vibrations of the furnace have hitherto caused a partial separation between the external charge detection member 12b and the piezoelectric element 11 or the insulating ring 24. However, when the entire charge detecting unit is heated while the adhesive properties of the constituent elements thereof are maintained with the use of the weight 30, the stress distribution in the piezoelectric element 11 at the time a pressure is applied to the charge detecting unit tends to become positively uniform.

In the above-described embodiment, because the pressure receiving plate 16 has an external surface serving as the pressure receiving surface 16a and an internal surface held in contact with the metallic piece 21, the thermal capacity of the pressure receiving surface 16a is enlarged. In other words, the pressure receiving surface 16a has very low rigidity in the axial direction thereof and a relatively large thermal capacity.

Because of this, even when rapid temperature changes have occurred, for example, in suction strokes or combustion and expansion strokes of the engine, the sensitivity or tendency of the pressure receiving surface to expand and contract when subjected to heat generated in the proximity thereof can be reduced, thereby preventing the occurrence of strains in the output waveform. Also, because the pressure transmission member for transmitting the pressure applied to the pressure receiving surface to the piezoelectric element is made of ceramic, the transmission of heat from the pressure receiving surface to the piezoelectric element is intercepted by the pressure transmission member. Accordingly, the piezoelectric element is not subjected to high temperatures and, hence, is prevented from deteriorating, thereby reducing variations in sensitivity thereof.

In addition, the temperature-sensitive resistor element inside the sensor housing can change the amplification factor of charges generated by the piezoelectric element according to the resistance value thereof, and is, hence, effectively utilized to control the gain of a charge amplifier. Because sensitivity changes of the piezoelectric element caused by temperature changes of the entire sensor housing are reduced or appropriately rectified, variations in sensor output with respect to the temperature changes can be reduced.

Even when the entire sensor housing is at a high temperature, the connector having the metallic terminals for electrically connecting the pressure sensor to connection cables of the charge amplifier provides sufficiently high insulating properties between the sensor housing and the signal lines and prevents charge leakage which may occur in a charge transmission system between the piezoelectric element and the charge amplifier. Accordingly, because the sensor output is not affected by a signal from the temperature-sensitive resistor element, the output drift can be prevented, and the pressure sensor provides reliable outputs for a long time even at high temperatures.

Furthermore, the use of the heat-shrinkable tube to fix the external electrode contributes to the manufacture of piezoelectric pressure sensors having a reduced outer diameter.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A piezoelectric pressure sensor comprising:
   a generally elongated sensor housing having first and second ends opposite to each other;
   a pressure receiving plate having first and second surfaces opposite to each other and disposed at the first end of said sensor housing, the first surface of said pressure receiving plate serving as a pressure receiving surface for receiving a pressure applied from outside of said sensor housing;
   a pressure transmission member having first and second ends opposite to each other, said pressure transmission member being accommodated in said sensor housing with the first end of said pressure transmission member being held in contact with the second surface of said pressure receiving plate;
   a tubular piezoelectric element having first and second ends opposite to each other, said piezoelectric element being accommodated in said sensor housing with the first end of said piezoelectric element being held in contact with the second end of said pressure transmission member, said piezoelectric element having external and internal surfaces;
   external and internal electrodes formed on the external and internal surfaces of said piezoelectric element, respectively;
   an external charge detection member held in contact with said external electrode for collecting charge generated by said piezoelectric element;
   a heat-shrunk tube encircling said external charge detection member, said tube being thermally shrunk to compress said external charge detection member radially inwardly against said external electrode;
   a fixing screw threaded into said sensor housing for holding in a prestressed fashion said piezoelectric element and said pressure transmission member against said pressure receiving plate; and
   an internal charge detection member held in contact with said internal electrode for extracting charge therefrom.

2. The piezoelectric pressure sensor according to claim 1 wherein said external charge detection member has a projection to which a lead wire is connected.

3. The piezoelectric pressure sensor according to claim 1 wherein said external charge detection member has a comb-ended tubular body.

4. A piezoelectric pressure sensor comprising:
   a generally elongated sensor housing having first and second ends opposite to each other;
   a pressure receiving plate having first and second surfaces opposite to each other, said pressure receiving plate being disposed at the first end of said sensor housing with the first surface of said pressure receiving plate serving as a pressure receiving surface for receiving a pressure applied from outside of said sensor housing;
   a pressure transmission member having first and second ends opposite to each other, said pressure transmission member being accommodated in said sensor housing with the first end of said pressure transmission member being held in contact with the second surface of said pressure receiving plate;
   a tubular piezoelectric element having first and second ends opposite to each other, said piezoelectric element being accommodated in said sensor housing with the first end of said piezoelectric element being held in contact with the second end of said pressure transmission member, said piezoelectric element having external and internal surfaces;
   external and internal electrodes formed on the external and internal surfaces of said piezoelectric element, respectively;
   an external charge detection member having a tubular contact portion and a flange extending radially inwardly from said contact portion, with said contact portion held in contact with said external electrode for collecting charge generated by said piezoelectric element;
   an insulating ring disposed between the second end of said piezoelectric element and said flange of said external charge detection member;
   a heat-shrunk tube encircling said external charge detection member, said tube being thermally shrunk to compress said external charge detection member radially inwardly against said external electrode;
   a fixing screw threaded into said sensor housing for holding in a prestressed fashion said piezoelectric element and said pressure transmission member against said pressure receiving plate; and
   an internal charge detection member held in contact with said internal electrode for extracting charge therefrom,
   whereby the charge collected by said contact portion of said external charge detection member is detected via said flange of said external charge detection member.

5. The piezoelectric pressure sensor according to claim 4 wherein said tubular contact portion of said external charge detection member is partially in the form of a comb.

6. The piezoelectric pressure sensor according to claim 4 wherein said flange of said external charge detection member is pressed down by said fixing screw to allow the charge generated by said piezoelectric element to be detected.

7. A piezoelectric pressure sensor comprising:
   a generally elongated sensor housing having first and second ends opposite to each other;
   a pressure receiving plate having first and second surfaces opposite to each other, said pressure receiving plate being disposed at the first end of said sensor housing with the first surface of said pressure receiving plate serving as a pressure receiving surface for receiving a pressure applied from outside of said sensor housing;
   a metallic piece having first and second surfaces opposite to each other, said metallic piece being accommodated in said sensor housing with the first surface of said metallic piece being held in contact with the second surface of said pressure receiving plate;
   a tubular diaphragm having first and second ends opposite to each other, said first end of said diaphragm being fixedly mounted on said metallic piece such that, upon application of the pressure to said pressure receiving plate, said diaphragm expands or contracts;
   a piezoelectric element accommodated in said sensor housing and disposed remote from the second end of said diaphragm; and a pressure transmission member accommodated in said sensor housing and having a first end held in contact with the second surface of said metallic piece and a second end held in contact with said piezoelectric element for transmitting the pressure applied to said pressure receiving surface to said piezoelectric element.

8. A piezoelectric pressure sensor comprising:

a generally elongated sensor housing having a recess defined therein and having first and second ends opposite to each other;

a pressure receiving plate having first and second surfaces opposite to each other, said pressure receiving plate being disposed at the first end of said sensor housing with the first surface of said pressure receiving plate serving as a pressure receiving surface for receiving a pressure applied from outside of said sensor housing;

a pressure transmission member having first and second ends opposite to each other, said pressure transmission member being accommodated in said sensor housing with the first end of said pressure transmission member being held in contact with the second surface of said pressure receiving plate;

a piezoelectric element having first and second ends opposite to each other, said piezoelectric element being accommodated in said sensor housing with the first end of said piezoelectric element being held in contact with the second end of said pressure transmission member;

a piezoelectric element fixing member accommodated in said sensor housing and held in contact with the second end of said piezoelectric element;

a connector having a ceramic base and a plurality of terminals carried by said ceramic base, said connector being disposed at the second end of said sensor housing for hermetically sealing the recess of said sensor housing; and a temperature-sensitive resistor element interposed between said connector and said piezoelectric element fixing member and connected to said connector.

* * * * *